(12) United States Patent
Kneckt et al.

(10) Patent No.: US 10,575,242 B2
(45) Date of Patent: Feb. 25, 2020

(54) EXTENDED RANGE NETWORKING

(71) Applicant: Apple Inc., Cupertino, CA (US)

(72) Inventors: Jarkko L. Kneckt, Cupertino, CA (US); Christiaan A. Hartman, Cupertino, CA (US); Guoqing Li, Campbell, CA (US); Joonsuk Kim, Cupertino, CA (US); Matthew L. Semersky, Cupertino, CA (US); Oren Shani, Cupertino, CA (US); Syed A. Mujtaba, Santa Clara, CA (US); Yong Liu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 15/653,825

(22) Filed: Jul. 19, 2017

(65) Prior Publication Data

US 2018/0027485 A1    Jan. 25, 2018

Related U.S. Application Data

(60) Provisional application No. 62/365,614, filed on Jul. 22, 2016.

(51) Int. Cl.
| | |
|---|---|
| *H04W 48/14* | (2009.01) |
| *H04B 17/318* | (2015.01) |
| *H04W 8/00* | (2009.01) |
| *H04W 4/80* | (2018.01) |
| H04B 7/00 | (2006.01) |
| H04W 4/00 | (2018.01) |
| H04W 24/00 | (2009.01) |
| H04W 68/00 | (2009.01) |

(52) U.S. Cl.
CPC .......... *H04W 48/14* (2013.01); *H04B 17/318* (2015.01); *H04W 4/80* (2018.02); *H04W 8/005* (2013.01); *H04B 7/00* (2013.01); *H04W 4/00* (2013.01); *H04W 24/00* (2013.01); *H04W 68/00* (2013.01)

(58) Field of Classification Search
CPC .................................................... H04W 48/14
See application file for complete search history.

(56) References Cited

U.S. PATENT DOCUMENTS

| | | | |
|---|---|---|---|
| 8,223,662 B2* | 7/2012 | Deshpande | ....... H04W 52/0216 370/252 |
| 9,357,570 B2* | 5/2016 | Kwon | ................... H04W 76/10 |
| 2003/0163579 A1* | 8/2003 | Knauerhase | .......... H04W 16/06 709/230 |
| 2006/0135191 A1* | 6/2006 | Matsui | ................. H04B 17/309 455/515 |

(Continued)

*Primary Examiner* — Andrew Lai
*Assistant Examiner* — Andrew C Lee
(74) *Attorney, Agent, or Firm* — Sterne, Kessler, Goldstein & Fox P.L.L.C.

(57) ABSTRACT

Passive and active scanning for extended range wireless networking. The choice between legacy and extended range signaling can depend on one or more factors. For passive scanning, an electronic device may transmit a combination of legacy beacons and extended range beacons for network discovery by receiving electronic devices. For active scanning, an electronic device may transmit extended range probe requests in addition to legacy probe requests to discover all of the access points within its transmission range. Responses to probe requests can use extended range, legacy, single user, and/or multi user protocols.

20 Claims, 12 Drawing Sheets

(56) References Cited

U.S. PATENT DOCUMENTS

| | | | | |
|---|---|---|---|---|
| 2007/0010237 A1* | 1/2007 | Jones | H04W 88/10 | 455/422.1 |
| 2010/0165963 A1* | 7/2010 | Chu | H04L 12/43 | 370/338 |
| 2011/0206017 A1* | 8/2011 | Taghavi Nasrabadi | H04B 1/719 | 370/336 |
| 2011/0211616 A1* | 9/2011 | Taghavi Nasrabadi | H04B 1/707 | 375/146 |
| 2012/0314696 A1* | 12/2012 | Liu | H04W 28/065 | 370/338 |
| 2013/0142124 A1* | 6/2013 | Abraham | H04W 28/06 | 370/328 |
| 2013/0230035 A1* | 9/2013 | Grandhi | H04W 48/16 | 370/338 |
| 2014/0071959 A1* | 3/2014 | Ghosh | H04W 72/0446 | 370/336 |
| 2014/0119303 A1* | 5/2014 | Kwon | H04W 76/10 | 370/329 |
| 2014/0314054 A1* | 10/2014 | Seok | H04W 8/26 | 370/336 |
| 2014/0328238 A1* | 11/2014 | Seok | H04W 74/04 | 370/311 |
| 2014/0348047 A1* | 11/2014 | Park | H04W 52/0216 | 370/311 |
| 2015/0139207 A1* | 5/2015 | Seok | H04W 48/14 | 370/338 |
| 2015/0156709 A1* | 6/2015 | Shukla | H04W 48/16 | 370/338 |
| 2015/0173010 A1* | 6/2015 | Ghosh | H04W 48/20 | 370/329 |
| 2015/0245236 A1* | 8/2015 | Lu | H04W 52/265 | 370/252 |
| 2015/0245282 A1* | 8/2015 | Kim | H04W 48/14 | 370/338 |
| 2016/0014609 A1* | 1/2016 | Goel | H04W 16/00 | 370/254 |
| 2016/0174016 A1* | 6/2016 | Moon | H04W 40/244 | 370/329 |
| 2016/0234807 A1* | 8/2016 | Levy | H04W 56/00 | |
| 2016/0286549 A1* | 9/2016 | Abraham | H04W 16/14 | |
| 2016/0330682 A1* | 11/2016 | Trainin | H04W 52/0206 | |
| 2017/0135120 A1* | 5/2017 | Hiremath | H04W 72/12 | |
| 2018/0167882 A1* | 6/2018 | Choi | H04W 52/02 | |
| 2018/0176069 A1* | 6/2018 | Lee | H04L 27/34 | |
| 2018/0279362 A1* | 9/2018 | Choi | H04W 74/00 | |
| 2018/0338321 A1* | 11/2018 | Shepard | H04W 72/14 | |

\* cited by examiner

| Type | Length | Beacon Interval | ER Beacon Interval | DTIM | ER DTIM | Beacon Termination | ER Beacon Termination | ER Beacon Offset |
|---|---|---|---|---|---|---|---|---|
| 1 | 1 | 2 | 2 | 1 | 1 | 1 | 1 | 1 |

Octets

802 — Type
804 — Length
806 — Beacon Interval
808 — ER Beacon Interval
810 — DTIM
812 — ER DTIM
814 — Beacon Termination
816 — ER Beacon Termination
818 — ER Beacon Offset

EXTENDED RANGE NETWORKING

CROSS-REFERENCE TO RELATED APPLICATIONS

The present application claims the benefit of U.S. Provisional Patent Application No. 62/365,614, filed Jul. 22, 2016, the entirety of which is herein incorporated by reference.

BACKGROUND

Field

This disclosure generally relates to extended range wireless networking using, for example, extended range beacons and/or active scanning mechanisms.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface.

In some wireless communication protocols, electronic devices detect each other by broadcasting beacons and scanning for the beacons broadcast from other electronic devices. For example, an electronic device that communicates with another electronic device in a wireless network using a communication protocol that is compatible with an IEEE 802.11 standard (which is sometimes referred to as 'Wi-Fi') may wake up its radio periodically to receive a beacon frame at beacon transmission times.

Some wireless communication protocols include an extended range signal that an electronic device can transmit for reception by other electronic devices from greater distances than the normal range signal. One such protocol is the IEEE 802.11 lax protocol, which is presently under development.

SUMMARY

Some embodiments relate to extended range wireless networking using extended range beacons and active scanning mechanisms. Beacons may be a form of passive scanning where receiving devices listen passively for beacons to discover nearby access points. In active scanning, devices may broadcast a probe request and nearby access points may respond accordingly. In active scanning, devices may also listen for beacons to aid in discovery of nearby access points.

Some embodiments relate to passive scanning in extended range networks wherein an access point may transmit both extended range and legacy beacons. Extended range beacons may be transmitted less frequently than legacy beacons. In some embodiments, an access point may initially form a basic service set using a combination of legacy and extended range beacons. The access point may then terminate transmission of extended range beacons, using legacy beacons which have a shorter preamble and require less time to transmit. The access point may terminate transmission of the beacons, forcing stations to rely on active scanning to discover the network.

Some embodiments relate to active scanning in extended range networks wherein a station may transmit both legacy and extended range probe requests in a single transmission opportunity. A responding access point may be allowed to choose how to respond to the multiple probe requests. In some embodiments, an access point receiving a legacy probe request may respond with a legacy probe response. In some embodiments, an access point may respond to a legacy probe request received with a weak signal strength using an extended range probe response. In some embodiments, a probe request may act as a trigger frame for a multi-user transmission of probe responses from multiple access points. Responding access points may choose which resources within the multi-user waveform to transmit their probe responses.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 8 illustrates an example information element enabling extended-range and legacy beaconing according to some embodiments of the disclosure.

Figure 1:
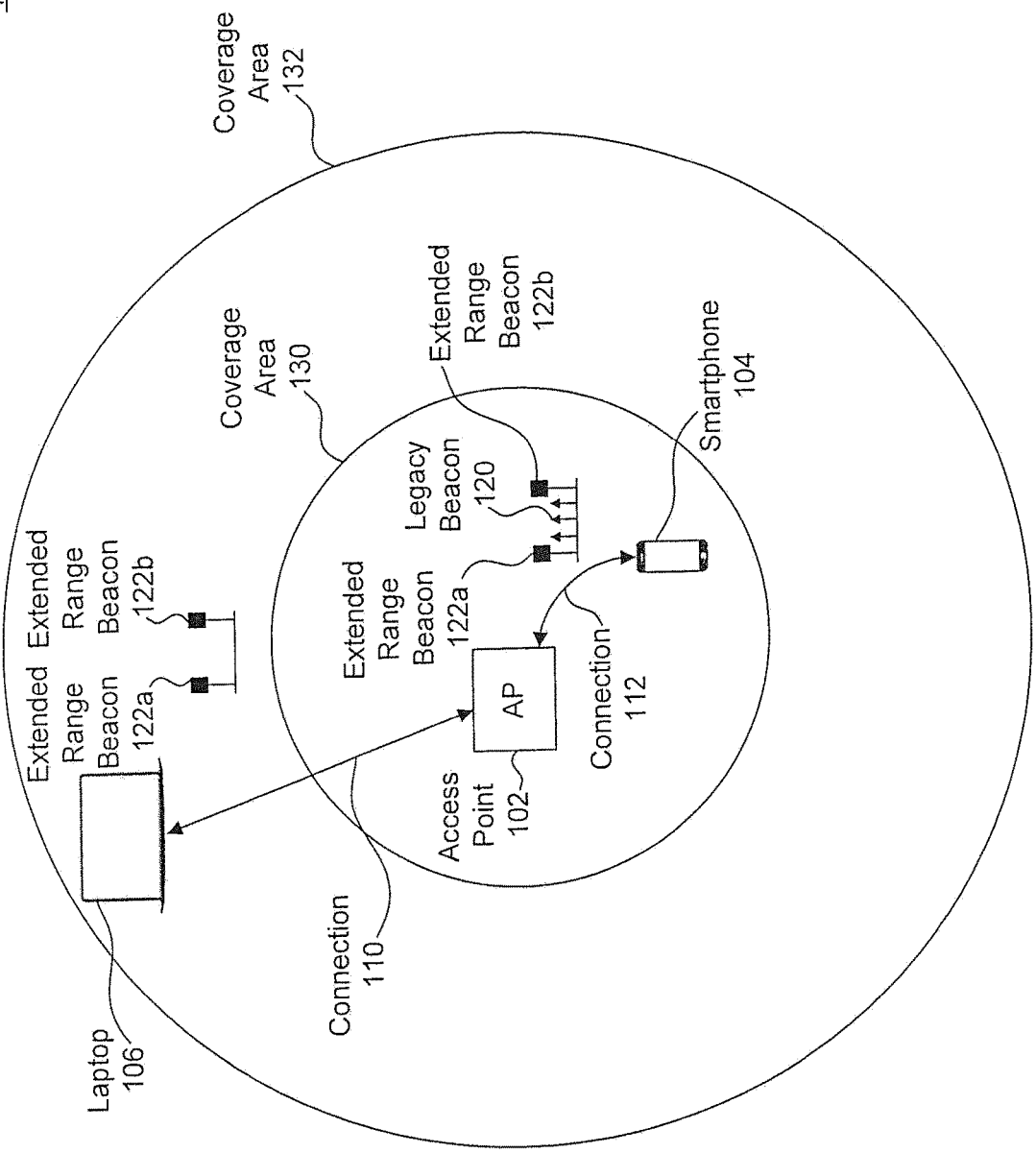
FIG. 1 illustrates an example system implementing extended range beaconing according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1 illustrates system 100, according to some embodiments of the disclosure. The example of system 100 includes an access point (AP) 102, smartphone 104, and a laptop 106. Smartphone 104 and laptop 106 may be considered stations (STAs) in the network, and, together with access point 102, form a basic service set (BSS). It is to be appreciated that system 100 may include other electronic devices in addition to or in place of the electronic devices illustrated in FIG. 1 without departing from the scope and spirit of this disclosure.

System 100 includes a connection 110 between access point 102 and laptop 106, as well as a connection 112 between access point 102 and smartphone 104. Connections 110 and 112 are wireless and may include but are not limited to a cellular network connection (such as but not limited to Universal Mobile Telecommunications System (UMTS) or with the Long-Term Evolution (LTE)), a wireless local network connection (such as but not limited to Institute of Electrical and Electronics Engineers (IEEE) 802.11 standard, which is sometimes referred to as Wi-Fi, or based on Bluetooth or Bluetooth Low Energy from the Bluetooth Special Interest Group of Kirkland, Wash.), or another wireless connection. For illustration purposes, examples will be provided in the context of an IEEE 802.11ax network. Although not shown, it is to be appreciated that there may be additional wired or wireless, direct or indirect connections between devices in system 100 such as between smartphone 104 and laptop 106.

In some embodiments, access point 102 may provide connectivity to an outside network, such as the Internet, to STAs within its coverage areas 130 and 132. Access point 102 may service a coverage area 130 using legacy signals. STAs within coverage area 130 can discover AP 102 using passive scanning by detecting legacy beacons 120, which contain information about the wireless network. STAs can also detect AP 102 using active scanning by transmitting a probe request to which nearby access points, including AP 102, may respond with a probe response. Coverage area 130 is illustrated as a circle for illustrative purposes. In some embodiments, coverage area 130 may have a different shape or may not have a well-defined shape.

Access point 102 may also service an extended coverage area 132 using extended range signals. STAs within extended coverage area 132, which includes coverage area 130, can discover AP 102 using passive scanning by detecting one or more extended range beacons 122a, 122b. STAs in extended coverage area 132 can also detect AP 102 using extended range active scanning by transmitting an extended range probe request to which nearby access points, including AP 102, may respond with an extended range probe response. In the extended range coverage area 132 outside of coverage area 130, STAs such as laptop 106 cannot reliably detect legacy beacons 120, or legacy probe responses, due to poor propagation conditions caused by, for example, being located far from AP 102. Poor propagation conditions resulting in an inability to reliably detect legacy beacons 120 could also be caused by a combination of other factors, such as an impeded line of sight or ambient interference.

Figure 2:
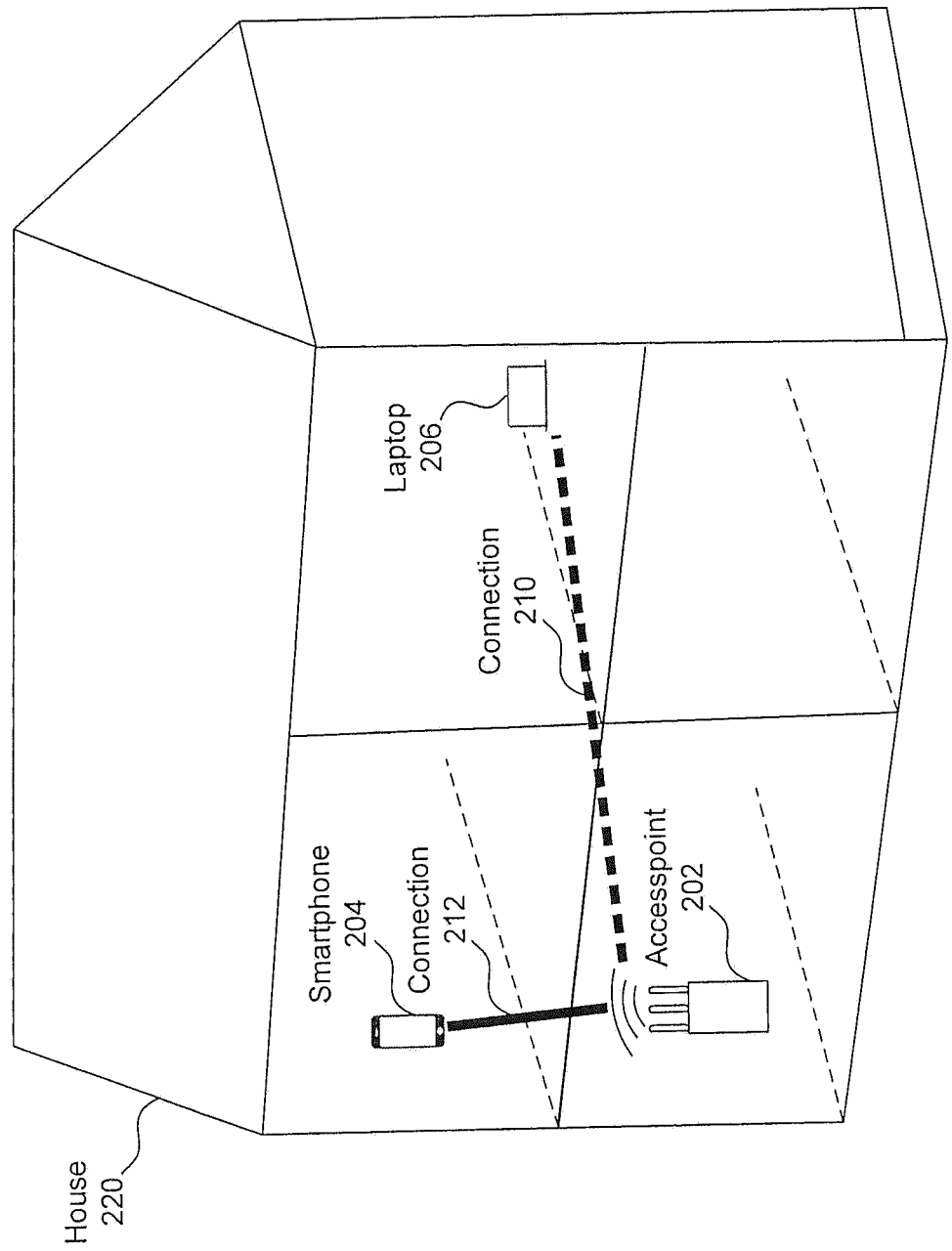
FIG. 2 illustrates an example home network implementing extended range beaconing according to some embodiments of the disclosure.

FIG. 2 illustrates system 200, according to some embodiments of the disclosure. The example of system 200 includes a home network comprising a home AP 202, smartphone 204, and a laptop 206, each located in a different room inside of a house 220. FIG. 2 illustrates an example embodiment of FIG. 1. In the example of FIG. 2, home AP 202 may service smartphone 204 using legacy signaling including legacy beacons over connection 212. In the illustrated embodiment, laptop 206 may not be able to reliably detect legacy signals due to its distance from home AP 202 and/or the walls impeding any line of sight between the two devices. In some embodiments, home AP 202 may therefore service laptop 206 with extended range signals, including extended range beacons for discovering the network, over connection 210.

Figure 3:
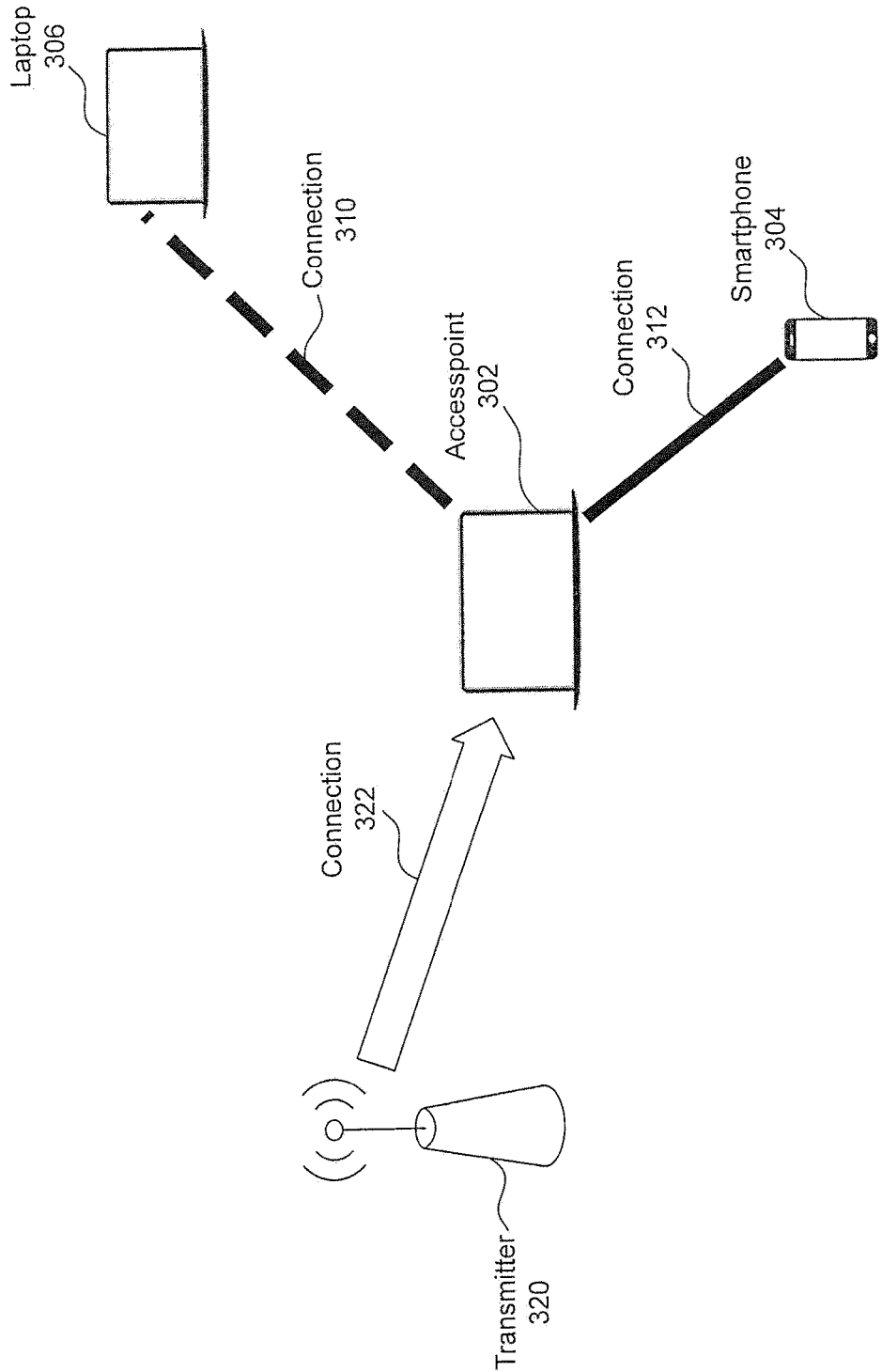
FIG. 3 illustrates an example peer-to-peer network implementing extended range beaconing according to some embodiments of the disclosure.

FIG. 3 illustrates system 300, according to some embodiments of the disclosure. The example of system 300 includes a peer-to-peer (P2P) network comprising laptop 302, laptop 306, and smartphone 304. In the illustrated configuration, laptop 302 may act as a peer-to-peer AP to service laptop 306 and smartphone 304. Peer-to-peer AP 302 services smartphone 304 using legacy signals including legacy beacons over connection 312.

In the illustrated embodiment, peer-to-peer AP or group owner 302 is connected to another network over connection 322. In some embodiments, connection 322 uses a different radio access technology (RAT) than that used over connections 310 and 312. For example, transmitter 320 may be an evolved NodeB (eNodeB) of an LTE network, and connection 322 may use LTE signaling, whereas connections 310 and 312 may use IEEE 802.1 lax signaling.

Connection 322 may provide information to the peer-to-peer AP 302 about the use of extended range beaconing. For example, in the illustrated embodiment, connection 322 provides information to peer-to-peer AP 302 indicating that extended range beaconing should be used. In response, peer-to-peer AP 302 may transmit extended range beacons. Because laptop 306 is not able to reliably detect legacy signals due to its distance from peer-to-peer AP 302, it may detect the transmitted extended range beacons and may be able to discover and join the network over connection 310. Peer-to-peer AP 302 may also use fast initial link setup (FILS) discovery frames to improve discoverability. Depending on the STA, peer-to-peer AP 302 may transmit FILS discovery frames using ER signaling such as extended range single-user protocol data unit illustrated in FIG. 5.

Figure 4:
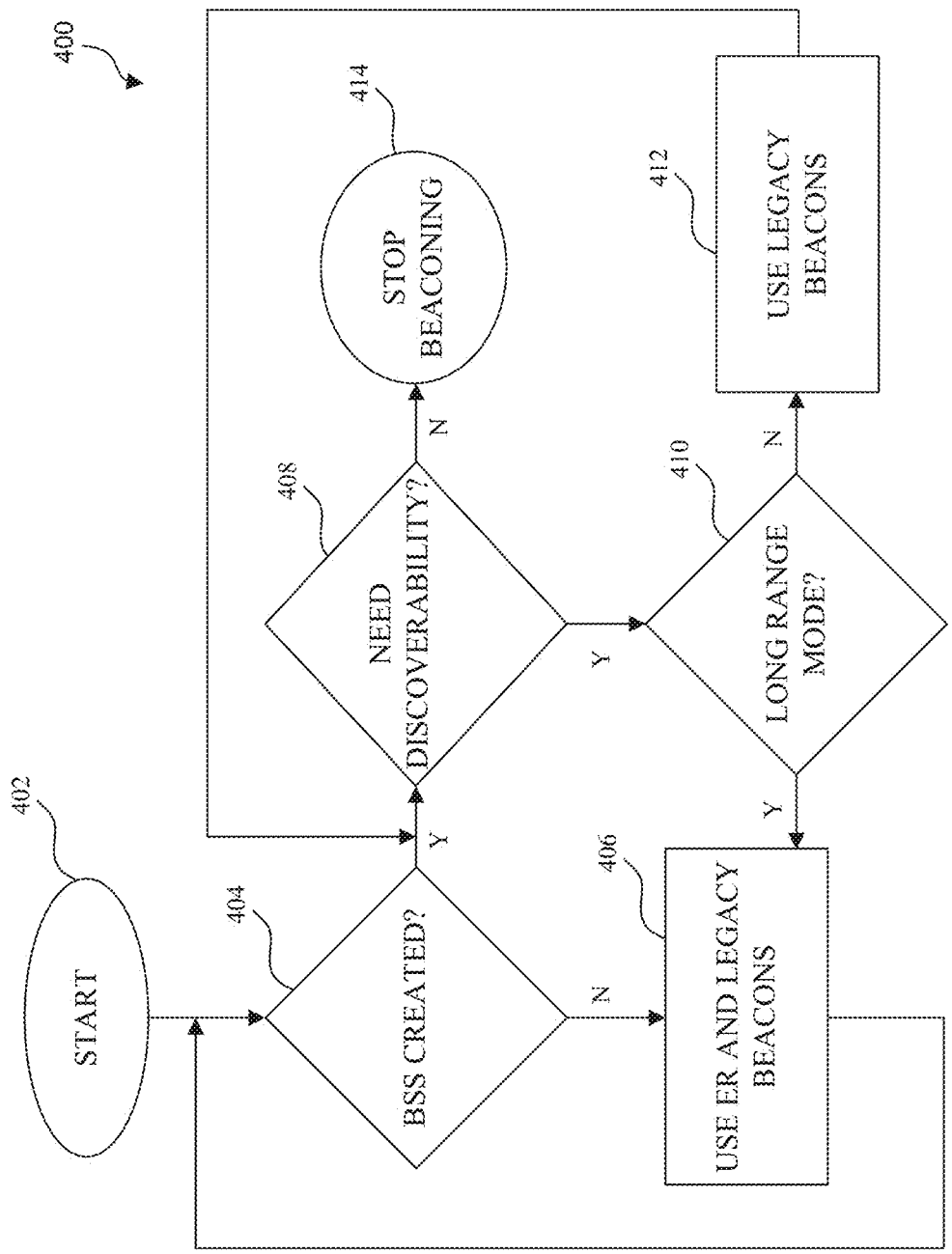
FIG. 4 is an example flowchart for determining beaconing mode in a peer-to-peer network according to some embodiments of the disclosure.

FIG. 4 is a flowchart for an example method 400 for determining beaconing mode in a peer-to-peer network according to some embodiments of the disclosure. For illustrative purposes and without limitation, method 400 is described with regard to FIG. 3. It is to be appreciated that not all steps may be needed to perform the disclosure provided herein. Further, some of the steps may be performed simultaneously, or in a different order than shown in FIG. 4, as will be understood by a person of ordinary skill in the art.

Because beaconing, especially extended range beaconing, consumes overhead and power, in some embodiments peer-to-peer AP 302 may change between beaconing modes based on a determination of the likelihood that peer-to-peer AP 302 will be discovered by other STAs. At 404, peer-to-peer AP 302 determines whether the BSS has been created. For example, peer-to-peer AP 302 determines whether any STAs 304 and 306 have joined the network.

If the BSS has not been created, then at 406 peer-to-peer AP 302 transmits both extended range (ER) and legacy beacons. As is further discussed relative to FIG. 6, in some embodiments legacy beacons are more efficient and are transmitted more often than ER beacons. Legacy beacons also enable backwards compatibility with previous versions of the RAT used to connect the peer-to-peer network. For example, if the peer-to-peer AP 302 transmits according to IEEE 802.11ax, it may use legacy beacons that can be detected by STAs compatible with IEEE 802.11ac or IEEE 802.11n. In some embodiments, ER beacons are detectable only by STAs compatible with the RAT employed by peer-to-peer AP 302.

Peer-to-peer AP 302 may be configured to transmit ER and legacy beacons for a predetermined duration of time before returning to 404 and determining whether the BSS has been created. Once the BSS is created as determined at 404, peer-to-peer AP 302 may change its beaconing strategy. For example, at 408 peer-to-peer AP 302 determines whether it needs to be detectable using passive scanning. For example, peer-to-peer AP 302 may operate using battery power, and regular beaconing may consume unnecessary power.

If such discoverability is not needed, at 414 peer-to-peer AP 302 ceases transmission of beacons such that peer-to-peer AP 302 is not detectable using passive scanning. In some embodiments, peer-to-peer AP may transmit traffic through target wake time (TWT) scheduling. With TWT, peer-to-peer AP 302 permits access to a STA at a specific time, allowing a STA to enter a low-power sleep mode until its next target wake time.

At 410, after determining in 408 that discoverability using passive scanning is needed, peer-to-peer AP 302 determines whether extended range detectability is required. In some embodiments, since extended range signals contain more redundancy than legacy signals and require more transmit power, peer-to-peer AP 302 can disable ER beacons while still transmitting legacy beacons. In some embodiments, peer-to-peer AP 302 makes determination 410 using information received from an external RAT over connection 322. In some embodiments, peer-to-peer AP 302 makes determination 410 using criteria stored internally to peer-to-peer AP 302. If peer-to-peer AP 302 determines in 410 that long range transmissions are not needed, then peer-to-peer AP 302 transmits only legacy beacons at 412. In this state, peer-to-peer AP 302 continues to serve those STAs that cannot reliably detect legacy beacons using ER transmissions such as the extended range single-user protocol data unit shown in FIG. 5. However, no further ER beacons are transmitted to allow passive scanning at extended ranges.

The beaconing mode can change at a later time based on updated information, and therefore peer-to-peer AP 302 may subsequently re-evaluate whether discoverability using passive scanning is needed at all at 408. For example, in some embodiments the peer-to-peer AP 302 eventually transitions to sending only legacy beacons to conserve energy.

Figure 5:
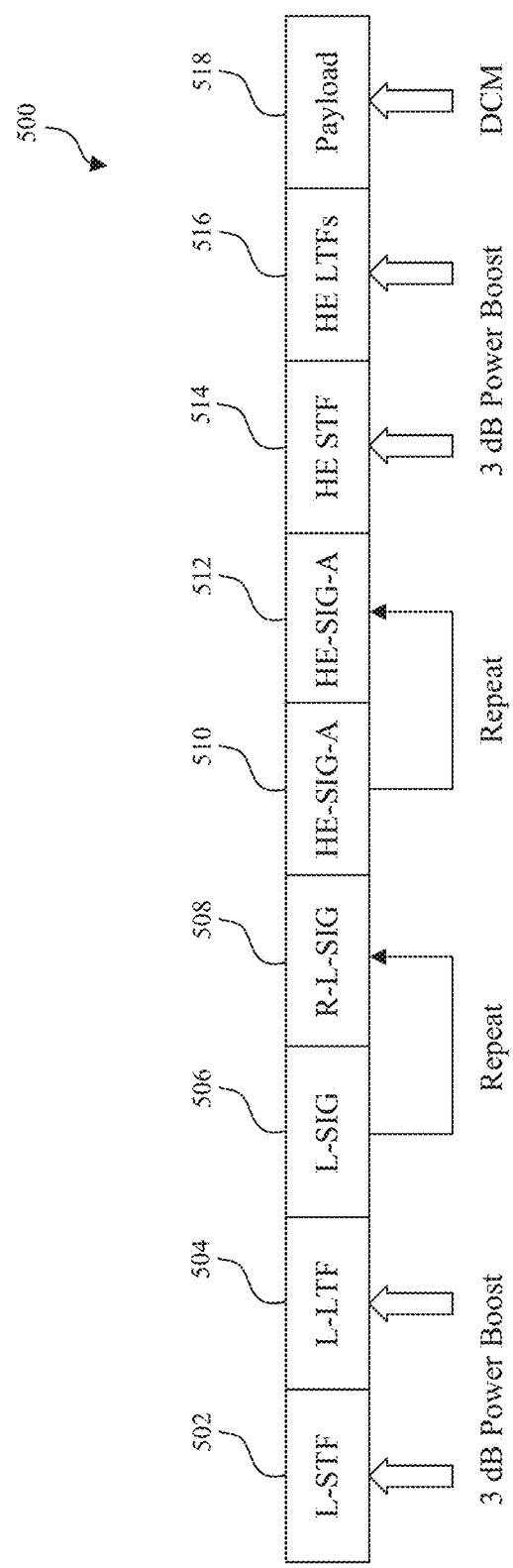
FIG. 5 illustrates an example extended range single-user protocol data unit according to some embodiments of the disclosure.

FIG. 5 illustrates an example extended range single-user protocol data unit 500 according to some embodiments of the disclosure. For illustrative purposes, the present disclosure discusses extended range single-user protocol data unit 500 as a physical layer convergence protocol (PLCP) protocol data unit, or PPDU, for the IEEE 802.1 lax standard. The extended range PPDU 500 comprises a preamble and a payload 518. The illustrated preamble includes a legacy short training field (L-STF) 502, a legacy long training field (L-LTF) 504, a legacy signal field (L-SIG) 506, a repeated legacy signal field (R-L-SIG) 508, high efficiency signal fields (HE-SIG-A) 510 and 512, high efficiency short training field (HE STF) 514, and high efficiency long training fields (HE LTFs) 516.

L-STF 502 corresponds to the short training field of the IEEE 802.11a standard in some embodiments. In some embodiments, the L-STF 502 may comprise ten repetitions of a short training sequence over two orthogonal frequency division multiplexing (OFDM) symbols. The OFDM symbols may include subcarriers modulated with binary phase shift keying (BPSK) symbols. The L-STF 502 can be used by receiving electronic devices for coarse frequency synchronization, timing acquisition, and automatic gain control. In extended range PPDU 500, L-STF 502 may be transmitted with 3 dB more transmit power than in a legacy PPDU. This is possible because the L-STF 502 may have a lower peak-to-average power ratio (PAPR) than the payload 518.

L-LTF 504 corresponds to the long training field of the IEEE 802.11a standard in some embodiments. In some embodiments, the L-STF 505 comprises two repetitions of a long training sequence over two OFDM symbols. Like the L-STF 502, the OFDM symbols of the L-LTF 504 may include subcarriers modulated with BPSK symbols. The L-LTF 502 can be used by receiving electronic devices for channel estimation and fine frequency synchronization. In extended range PPDU 500, L-LTF 504 may be transmitted with 3 dB more transmit power than in a legacy PPDU. This is possible because the L-LTF 504 may have a lower PAPR than the payload 518.

L-SIG 506 corresponds to the legacy signal field of the IEEE 802.11a standard in some embodiments. In some embodiments, the L-SIG 506 comprises a single OFDM symbol encoded with BPSK symbols and may include information such as the rate and length of the preamble. R-L-SIG 508 is a repetition of L-SIG 506 for increased redundancy in extended range PPDU 500.

HE-SIG-A 510 corresponds to the high efficiency signal field of the IEEE 802.1 lax standard in some embodiments. In some embodiments, the HE-SIG-A 510 comprises two OFDM symbols encoded with BPSK symbols and may include control information about the remainder of the transmission, including bandwidth, guard interval length, length of the high efficiency long training fields 516, and an indicator for single- or multi-user transmission. HE-SIG-A 510 is present in all 802.11ax transmissions but may be repeated as HE-SIG-A 512 for increased redundancy in extended range PPDU 500.

HE STF 514 corresponds to the high efficiency short training field of the IEEE 802.1 lax standard in some embodiments. In some embodiments, the HE STF 514 comprises one or more OFDM symbols. The HE STF 514 can be used by receiving electronic devices for refined automatic gain control for the HE transmission, which may utilize a larger bandwidth and a larger OFDM symbol than the legacy 802.11a transmissions. In extended range PPDU 500, HE STF 514 may be transmitted with 3 dB more transmit power than in a normal HE PPDU. This is possible because the HE STF 514 may have a lower PAPR than the payload 518.

HE LTFs 516 correspond to the high efficiency long training fields of the IEEE 802.1 lax standard in some embodiments. In some embodiments, the HE LTFs 516 comprise one or more repetitions of a long training sequence modulated onto one or more OFDM symbols. In some embodiments, there may be one, two, or four HE LTFs 516, the exact number of which is signaled in the HE-SIG-A 510 and 512. The HE LTFs 514 can be used by receiving electronic devices for channel estimation and fine frequency synchronization for the HE transmission, which may utilize a larger bandwidth and a larger OFDM symbol than the legacy 802.11a transmissions. In extended range PPDU 500, HE LTFs 516 may be transmitted with 3 dB more transmit power than in a normal HE PPDU. This is possible because the HE LTFs 516 may have a lower PAPR than the payload 518.

Payload 518 corresponds to the payload of the IEEE 802.1 lax standard in some embodiments. In some embodiments, the payload 518 comprises one or more OFDM symbols modulated with dual carrier modulation (DCM). Payload information can include, but is not limited to, beacon information elements, probe request/response information, uplink data, downlink data, peer-to-peer data, or association information. In some embodiments, the payload 518 is transmitted using the same bandwidth and OFDM symbol size as the HE STF 514 and HE LTFs 516.

In some embodiments, the various OFDM symbols of the extended range PPDU 500 can be transmitted with an extended guard interval ranging from 800 ns to 3200 ns. Since the guard interval for the HE STF 514, HE LTFs 516, and Payload 518 are signaled separately in the HE-SIG-A, the guard interval for the OFDM symbols in these portions of the payload may be different than the guard intervals for the OFDM symbols in the legacy portions of the payload 502-508 as well as for HE-SIG-A 510 and 512.

Figure 6:
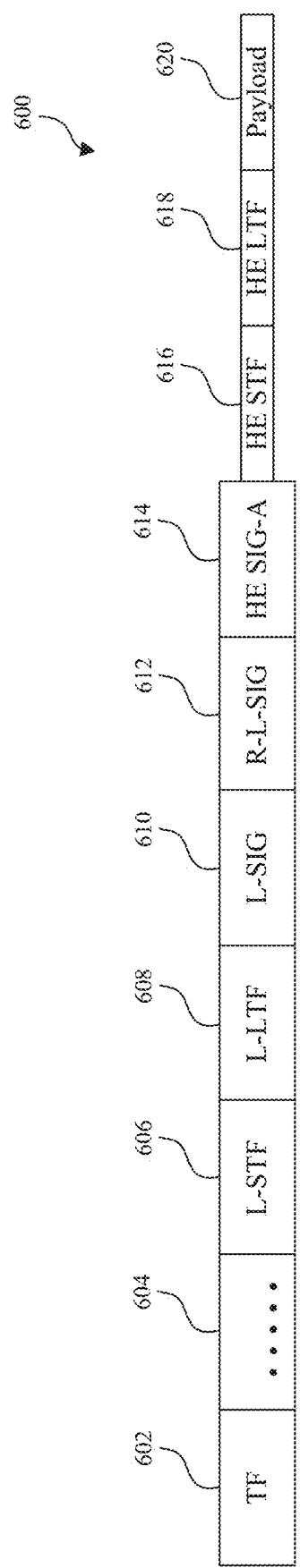
FIG. 6 illustrates an example extended range multi-user protocol data unit according to some embodiments of the disclosure.

FIG. 6 illustrates an example extended range multi-user protocol data unit 600 according to some embodiments of the disclosure. For illustrative purposes, the present disclosure discusses extended range multi-user protocol data unit 600 as a physical layer convergence protocol (PLCP) protocol data unit, or multi-user PPDU, for the IEEE 802.1ax standard. In some embodiments, the multi-user extended range PPDU 600 applies only to uplink transmissions (i.e., transmissions to an AP). The multi-user extended range PPDU 600 comprises a preamble and a payload 620. The payload 620 of multi-user extended range PPDU 600 may employ orthogonal frequency division multiple access (OFDMA), which allows multiple transmitters to simultaneously transmit data on mutually orthogonal subcarriers.

The multi-user extended range PPDU 600 occurs at some point after a trigger frame 602. Trigger frame 602 informs users as to which users can transmit in multi-user PPDU 600 and using which subcarriers of the OFDMA waveform in payload 620. The preamble of multi-user PPDU 600 is similar to that of the single-user PPDU 500 illustrated in FIG. 5 and discussed above, except that HE-SIG-A 614 may not be repeated in the multi-user PPDU 600. Moreover, to boost the transmit power per subcarrier for extended range signaling, the bandwidth of the HE signal (i.e., the HE STF 616, HE LTF 618, and payload 620) may be reduced relative to the initial portion of the multi-user PPDU 600. As will be shown in relation to FIG. 11, multi-user extended range PPDU 600 can be used for probe responses during extended range active scanning.

Figure 7:
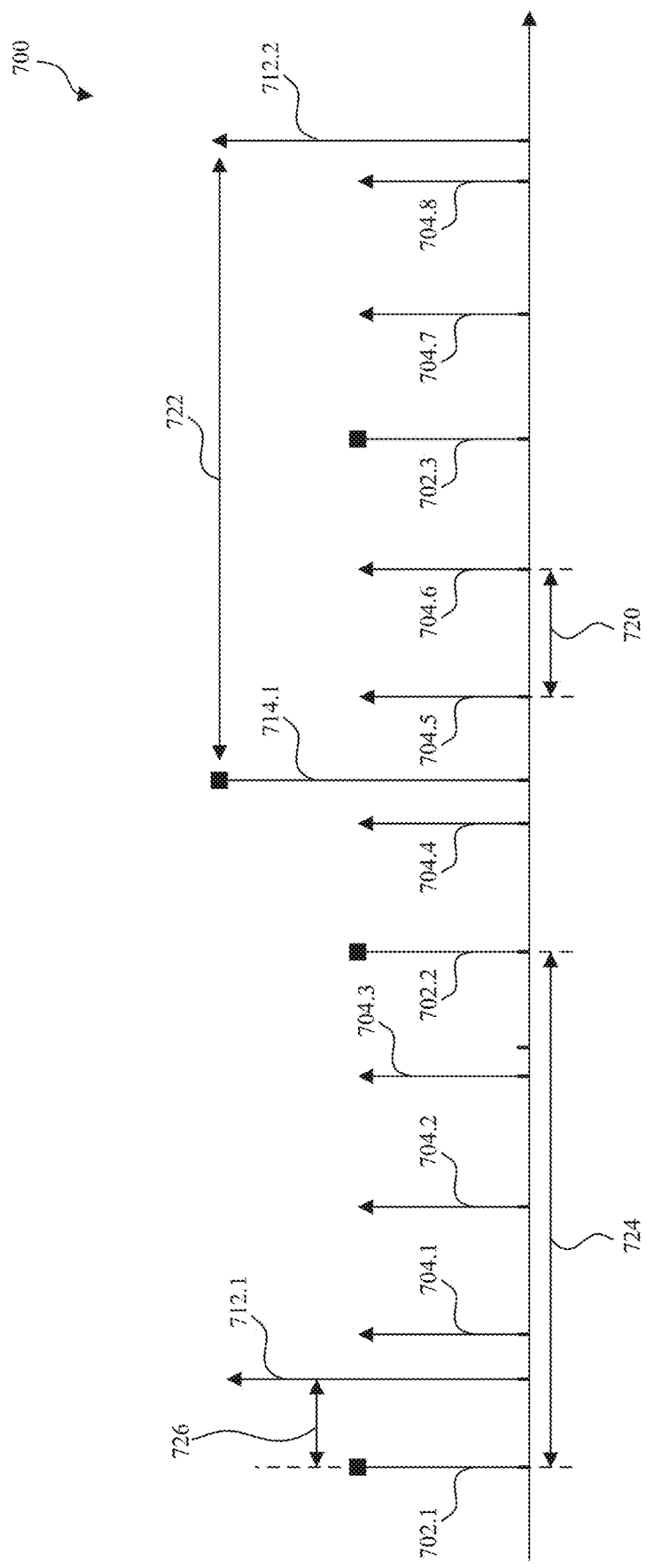
FIG. 7 illustrates example timing and signaling of legacy and extended-range beacons transmitted from an access point according to some embodiments of the disclosure.

FIG. 7 illustrates example timing and signaling of legacy and extended-range beacons transmitted from an access point according to some embodiments of the disclosure. An AP may be capable of transmitting legacy beacons 704.1-704.8, legacy delivery traffic indication map (DTIM) beacons 702.1-702.3, extended range beacons such as 712.1-712.2, and extended range DTIM beacons such as 714.1. Extended range beacons 712, 714 contain parameters for extended range transmissions, whereas legacy beacons 702, 704 contain parameters for legacy transmissions.

An AP may transmit legacy beacons 702, 704 according to embodiments of the present disclosure. The legacy beacons 702, 704 may be transmitted at a fixed interval 720, for example every 100 time units (TUs). Legacy DTIM beacons 702 may be distinguished from legacy beacons 704 by inclusion of an information element comprising a DTIM indicator. A DTIM indicates to STAs the presence of multicast or broadcast data to be transmitted in group-addressed frames subsequent to the beacon. In the illustrated embodiment, legacy DTIM beacons 702 are transmitted as every fourth legacy beacon, resulting in a fixed interval 724 between legacy DTIM beacons 702. In the illustrated example embodiment, three of every four legacy beacons are legacy time indication map (TIM) beacons 704 that do not include a DTIM information element and are not followed by group-addressed frames.

An AP may also transmit extended range beacons 712, 714 according to some embodiments of the present disclosure. The extended range beacons 712, 714 may be transmitted at a fixed interval 722, which is illustrated in FIG. 7 as being larger than the fixed interval 720 between legacy beacons 702, 704. In some embodiments, extended range beacon interval 722 is 500 TUs. Extended range beacons 712 can be distinguished from extended range beacons 714 by inclusion of a DTIM information element. The subsequent group-addressed frames may also be transmitted using extended range signaling.

In some embodiments, to determine a target transmission time of future legacy beacons 702, 704, a receiving electronic device learns the time synchronization function (TSF), which specifies the current time, and the legacy beacon interval 720. Both of these parameters may be transmitted in a legacy beacon 702, 704. Given knowledge that a legacy beacon was transmitted at TSF value 0, a receiving electronic device can determine a target transmission time of the next legacy beacon. In some embodiments, beacons are transmitted when TSF is divisible by the legacy beacon interval 720.

To determine a target transmission time of future extended range beacons 712, 714, a receiving electronic device learns the TSF, the extended range beacon interval 722, and/or an extended range beacon offset (ERBO). Each of these parameters may be transmitted in an extended range beacon 712, 714. Given knowledge that an extended range beacon was transmitted at a TSF value equal to an initial offset 726, a receiving electronic device can determine a target transmission time of the next extended range beacon. In some embodiments, beacons are transmitted when the sum of the TSF and ERBO is divisible by the extended range beacon interval 722. For example, when initial offset 726 is 5 TUs, and extended range beacon interval 722 is 500 TUs, ERBO may be 495 TU. Thus, a receiving electronic device may calculate that extended range beacons will be transmitted at TSF equal to 5 TUs, 505 TUs, 1005 TUs, etc.

In some embodiments, if a target beacon transmit time for a legacy beacon overlaps with a target beacon transmit time for an extended range beacon, both beacons may be consecutively transmitted in the same transmission opportunity (TXOP) by the AP in some embodiments. In some embodiments, the legacy beacon may be canceled and only the extended range beacon will be transmitted by the AP.

FIG. 8 illustrates an example extended range beacon (ERB) information element (IE) 800 enabling extended-range and legacy beaconing according to some embodiments of the disclosure. The ERB IE 800 indicates when beacons of different types are transmitted and are going to stop being transmitted. The payload of an extended range beacon includes, in some embodiments, ERB IE 800. In some embodiments, the payload of a legacy beacon includes ERB IE 800. The illustrated embodiment of ERB IE 800 includes nine parameters over eleven octets of data: type 802, length 804, beacon interval 806, ER beacon interval 808, DTIM 810, ER DTIM 812, beacon termination 814, ER beacon termination 816, and ER beacon offset 818. The ERB IE 800 may also be transmitted by an AP in the payload of a probe response or association response frame. By including information about both legacy and ER beacons, a receiving electronic device can select the appropriate beacon for future reception or select another BSS.

In the illustrated example embodiment, type 802 is a one-octet parameter that specifies that the information element is an ERB IE. A receiving electronic device can use the type 802 as an indicator that information about extended range beaconing is contained in the remainder of the ERB IE 800. Legacy receiving electronic devices may not recognize the ERB IE type and may skip the entire information element based on this lack of recognition.

Length 804 is a one-octet parameter in the illustrated embodiment that specifies the length of the ERB IE 800. In some embodiments, the ERB IE 800 has variable length that is specified by length 804. In some embodiments, the ERB IE 800 has a fixed length which is signaled by length 804 to allow legacy receiving electronic devices to learn the length of ERB IE 800 in order to skip decoding it and move to the next IE.

Beacon interval 806 is a two-octet parameter in the illustrated embodiment that specifies the legacy beacon interval in TUs. In some embodiments, a TU is equal to 1.024 ms. Beacon interval 806 is signaled as an unsigned integer in some embodiments, and may be set to 100 TUs by default. Beacon interval 806 corresponds to legacy beacon interval 720 in the illustrated embodiment of FIG. 7.

ER beacon interval 808 is a two-octet parameter in the illustrated embodiment that specifies the extended range beacon interval in TUs. ER beacon interval 808 is signaled as an unsigned integer in some embodiments, and may be set to 500 TUs by default. ER beacon interval 808 corresponds to ER beacon interval 722 in the illustrated embodiment of FIG. 7.

DTIM 810 is a one-octet parameter in the illustrated embodiment that indicates the legacy DTIM beacon interval. DTIM 810 is signaled as an unsigned integer in some embodiments, and indicates which legacy beacons are DTIM beacons. In some embodiments, the DTIM 810 specifies the periodicity of DTIM beacons in terms of legacy beacons. For example, if DTIM 810 is two, then every other legacy beacon is a DTIM beacon in the illustrative example. DTIM 810 corresponds to the DTIM legacy beacon interval 724 in TUs divided by the legacy beacon interval 720.

ER DTIM 812 is a one-octet parameter in the illustrated embodiment that indicates the extended range DTIM beacon interval. ER DTIM 812 is signaled as an unsigned integer in some embodiments, and indicates which ER beacons are DTIM beacons. In some embodiments, the ER DTIM 812 specifies the periodicity of ER DTIM beacons in terms of ER beacons. For example, if ER DTIM 812 is two, then every other ER beacon is an ER DTIM beacon in the illustrative example.

Beacon termination 814 is a one-octet parameter in the illustrated embodiment that indicates when legacy beacon transmission will end. Beacon termination 814 is signaled as an unsigned integer in some embodiments. In some embodiments, beacon termination 814 is signaled in terms of beacon intervals. For example, if the beacon interval 806 is 100 TUs, and beacon termination 814 is 12 beacon intervals, then a receiving electronic device can determine that beacon transmissions will terminate in 1200 TUs. A value for beacon termination 814 of 255 (all ones) indicates that legacy beacon transmission will not be terminated.

ER beacon termination 816 is a one-octet parameter in the illustrated embodiment that indicates when ER beacon transmission will end. ER beacon termination 816 is signaled as an unsigned integer in some embodiments. In some embodiments, ER beacon termination 816 is signaled in terms of ER beacon intervals. For example, if the ER beacon interval 808 is 500 TUs, and beacon termination 814 is 2 beacon intervals, then a receiving electronic device can determine that ER beacon transmissions will terminate in 1000 TUs. A value for ER beacon termination 816 of 255 (all ones) indicates that ER beacon transmission will not be terminated.

ER beacon offset (ERBO) 818 is a one-octet parameter in the illustrated embodiment that indicates an offset between ER and legacy beacons. ERBO 818 is signaled as an unsigned integer of TUs in some embodiments. Unlike the legacy beacon, which is assumed to have been transmitted at TSF=0, an ER beacon is assumed to have been transmitted at TSF equal to an initial offset, such as initial offset 726 in FIG. 7. ERBO 818 corresponds to the difference between ER beacon interval 722 in TUs minus the initial ER beacon offset 726 in the illustrative embodiment of FIG. 7. For example, if an ER beacon was transmitted at TSF=5 TUs, and the ER beacon interval 808 is 500 TUs, then ERBO 818 is 495 TUs in some embodiments. In some embodiments, ERBO may be signaled as part of the HE capability information element rather than, or in addition to, the ERB IE 800. In some embodiments. ERBO may be signaled as a third information element rather than, or in addition to, HE capability information element and ERB IE 800.

Each beacon frame may contain timing and synchronization and/or beacon interval (which may also be referred to as beacon transmission periodicity). By receiving a single beacon, the STA may calculate the target transmit time of subsequent beacons. In some embodiments, the AP may select when it sends the ERB IE 800. For example, the AP may send the ERB IE 800 only if there is a change in beacon interval, and/or a change in the type of beacon being transmitted. In some embodiments, the AP may transmit the ERB IE 800 to enable STAs to learn that multiple beacon types are available.

Figure 9:
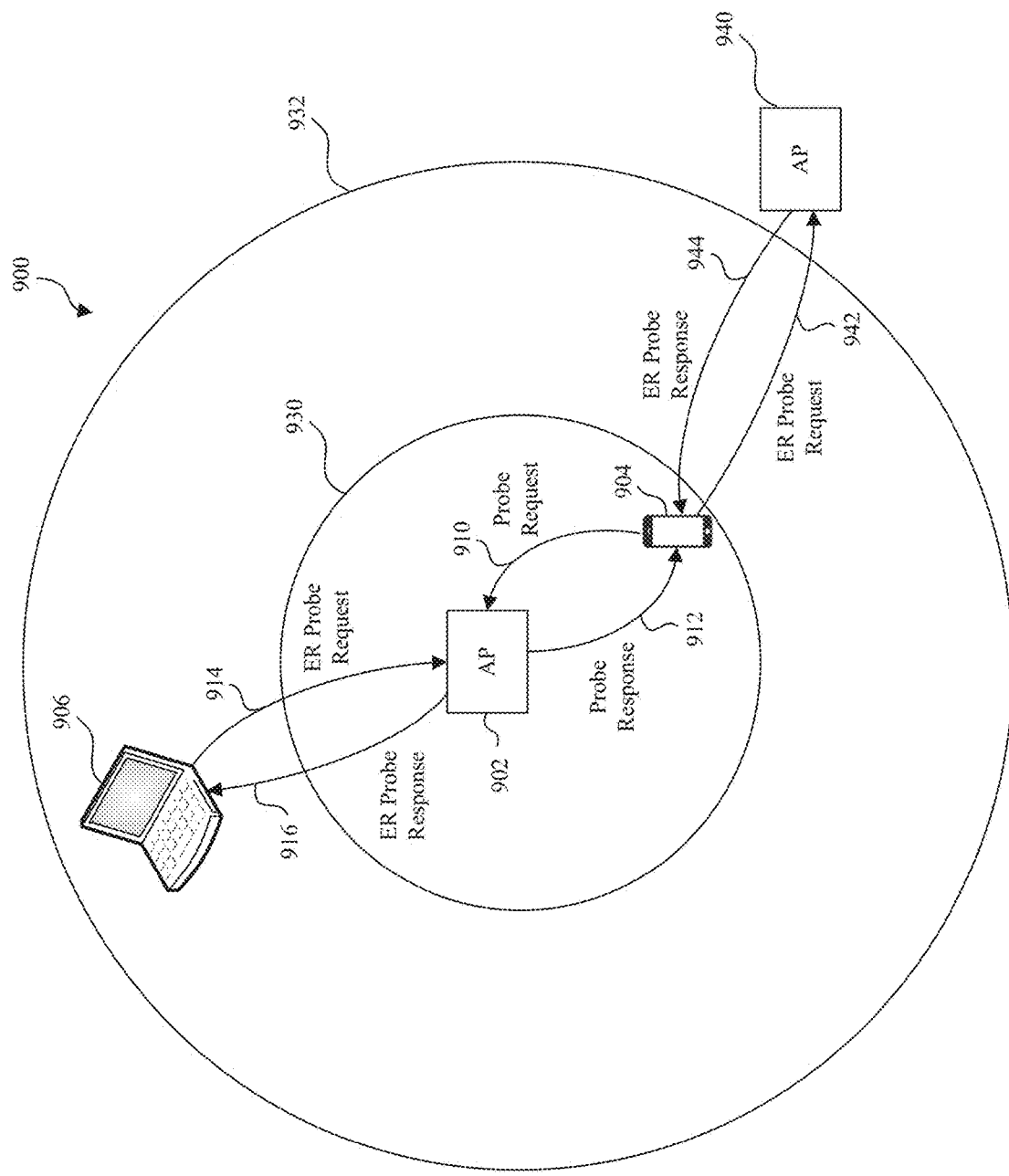
FIG. 9 illustrates active scanning in a wireless network according to some embodiments of the disclosure.

FIG. 9 illustrates active scanning in a wireless network 900 according to some embodiments of the disclosure. Rather than passively scanning for beacon transmissions from APs 902 and 940, STAs 904 and 906 transmit probe requests 910, 914, and 942. The transmitted probe requests 910, 914, and 942 are broadcast to the network, and the transmitting STA waits for responses from nearby APs. Active scanning allows for faster, more selective, and more reliable detection of nearby APs relative to passive scanning.

In the illustrated embodiment, STA 904 transmits a legacy probe request 910 in addition to an extended range probe request 942. AP 902 can detect the probe request 910 from STA 904 because STA 904 is in the legacy coverage area 930 of AP 902. AP 902 then transmits a probe response 912. AP 940, however, may be unable to reliably detect the probe request 910, but can detect ER probe request 942. In that case, AP 940 may respond to ER probe request 942 with an ER probe response 944. AP 940 responds with an ER probe response because STA 904 may be unable to reliably detect a legacy probe response from AP 940. AP 940 must be able to support extended range transmissions to respond to the ER probe request. For example, if AP 940 were a legacy AP, then ER probe request 942 would go undetected and unanswered by AP 940.

In the illustrated example embodiment, STA 906 also transmits an extended range probe request 914, and may also transmit a legacy probe request (not shown). AP 902 detects the ER probe request 914 but may not be able to reliably detect the legacy probe request transmitted by STA 906 because STA 906 lies in the extended coverage area 932 outside of the legacy coverage area 930 of AP 902. In this case, AP 902 responds with an ER probe response 916.

Using extended range PPDUs for active scanning may increase overhead, cause interference to a larger coverage area, and/or increase PPDU duration, as illustrated in FIG. 5. Furthermore, APs discovered using ER active scanning may have poor link performance. In FIG. 9, for example, STA 906 discovers AP 940, but may still decide to associate with AP 902 because it would not need to use the less efficient ER signaling to communicate with AP 902. However, ER active scanning enables a STA to discover APs within its entire transmission range, and to have a broader set of AP choices for association. As shown below in relation to FIGS. 10 and 11, the benefits of ER active scanning can be obtained while minimizing the negative aspects by performing legacy and ER active scanning concurrently.

Figure 10:
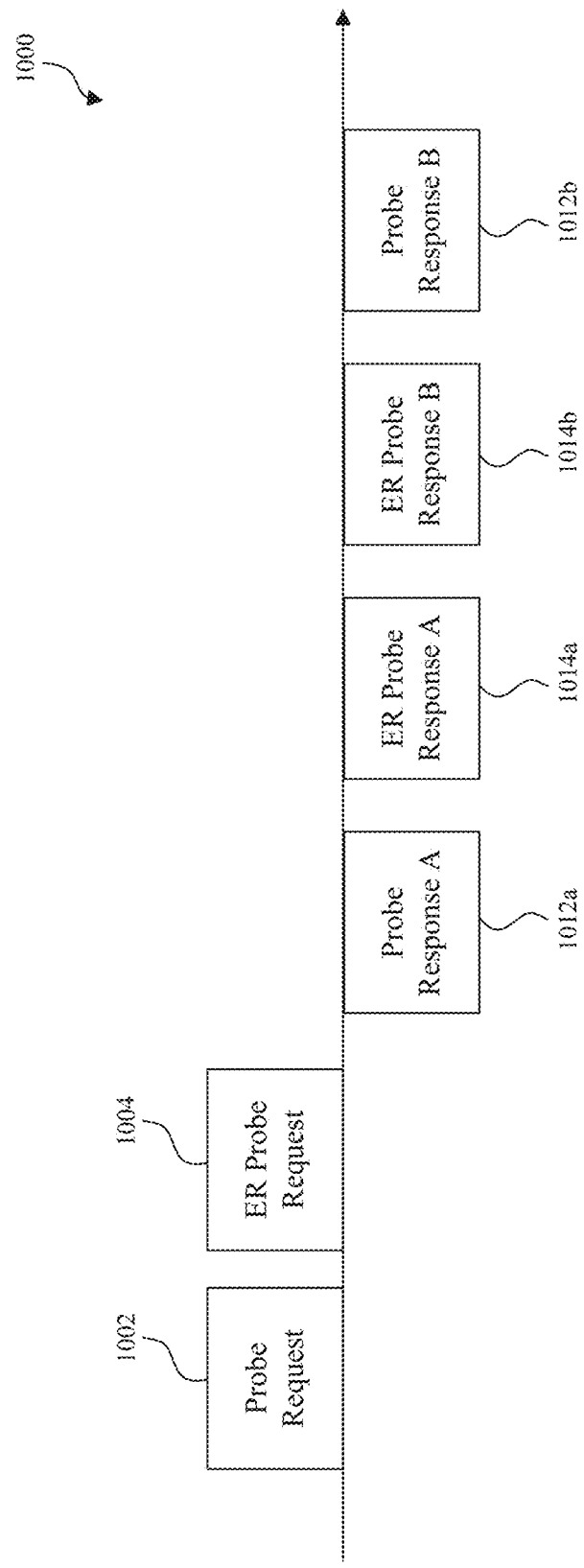
FIG. 10 illustrates example timing and signaling of extended range active scanning using single-user signaling according to some embodiments of the disclosure.

FIG. 10 illustrates example timing and signaling 1000 of extended range active scanning using single-user signaling according to some embodiments of the disclosure. Extended range signals 1004, 1014*a*, and 1014*b* use single-user extended range PPDUs such as the embodiment illustrated in FIG. 5. In the illustrated embodiment of FIG. 10, a STA transmits a legacy probe request 1002 followed immediately by an ER probe request 1004. Specifically, both legacy probe request 1002 and ER probe request 1004 are transmitted by a STA in the same TXOP. Transmitting both probe requests 1002 and 1004 in a TXOP reduces total scanning time and allows the STA to receive responses to both of the requests 1002 and 1004. The ER probe request 1004 will be detected and understood only by APs capable of extended range communication (extended range APs).

In the illustrated example embodiment of FIG. 10, probe request 1002 triggers two probe responses, probe response A 1012*a* and probe response B 1012*b*. These probe responses 1012*a* and 1012*b* may be transmitted by legacy APs that do not support extended range signaling. Probe responses 1012*a* and 1012*b* may also be transmitted extended range APs with wireless links that allow reliable detection of the legacy probe request 1002.

In some embodiments, the ER probe requests are directed to specific service set identifiers (SSIDs), rather than having a wildcard response criterion, to reduce the number of ER probe responses. Extended range probe request 1004 triggers two extended range probe responses, ER probe response A 1014*a* and ER probe response B 1014*b*. Both responses are transmitted by extended range APs because legacy APs cannot detect and respond to ER probe request 1004. The responding extended range APs may have reliably detected legacy probe request 1002 yet chose to respond with an extended range probe response 1014, for example to inform the requesting STA that the responding AP has extended range capability. A responding extended range AP may respond to a legacy probe request 1002 received with weak signal strength by transmitting an extended range probe response 1014*a* to ensure reliable detection by the STA. In some embodiments, a responding AP always transmits a legacy probe response 1012*a* in response to a received legacy probe request 1002. In some embodiments, a responding AP may transmit both a legacy probe response 1012*a* and an ER probe response 1014*a*.

Figure 11:
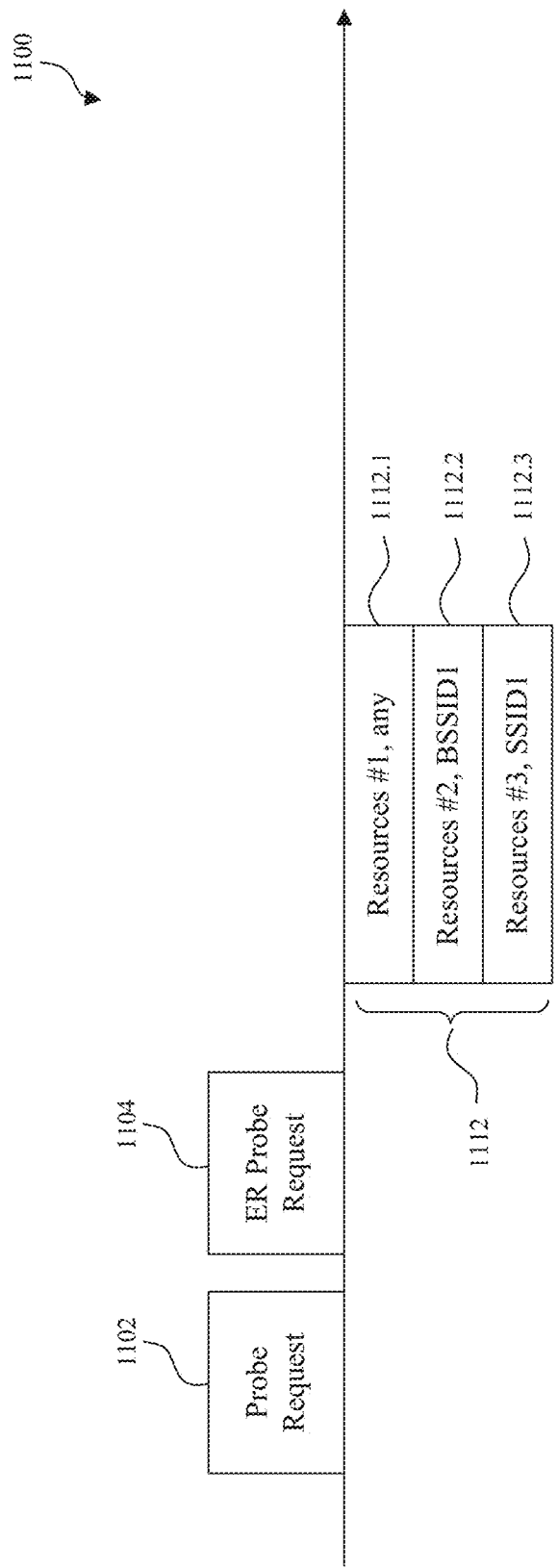
FIG. 11 illustrates example timing and signaling of extended range active scanning using multi-user signaling according to some embodiments of the disclosure.

FIG. 11 illustrates example timing and signaling of extended range active scanning using multi-user signaling according to some embodiments of the disclosure. ER probe request 1104 may allocate resources for responding APs to respond simultaneously using orthogonal subcarriers of an OFDMA waveform 1112. Relative to the embodiments illustrated in FIG. 6, the ER probe request 1104 corresponds to trigger frame 602 and the APs respond using the multi-user ER PPDU 600.

The ER probe request 1104 may allocate some resources 1112.1 of the OFDMA waveform 1112 to random access, allowing any APs to respond to the probe request. The ER probe request 1104 may allocate resources 1112.2 of the OFDMA waveform 1112 to a specific basic service set identifier (BSSID), which corresponds to a medium access control (MAC) address of an AP serving a BSS. In some embodiments, the ER probe request 1104 may allocate resources 1112.3 of the OFDMA waveform 1112 to a specific service set identifier (SSID), which corresponds to a human-readable name that may be shared among multiple APs. Allocating resources to specific BSSIDs or SSIDs reduces the risk of collision due to random access.

In some embodiments, probe request 1102, which is not an extended range signal, may serve as the trigger frame and resource allocator for OFDMA probe response 1112. Use of probe request 1102 for this purpose may reduce delays relative to ER signaling but would not provide the increased range of ER PPDUs.

The trigger frame (which may be either probe request 1102 or ER probe request 1104) may indicate that an AP can respond on any applicable resource. For example, if an AP's BSSID and SSID have been allocated resources in the OFDMA waveform 1112, the AP can choose which resource to transmit its probe response, including the random access resource 1112.1. In some embodiments, a STA may calculate a hash sum of the BSSID and SSID that reduces the possible set of matching BSSID and SSIDs. The length of the calculated sum may be tailored to fit lengths of the trigger frame fields in some embodiments. In some embodiments, the trigger frame may indicate that random access resource 1112.1 can only be used by APs that do not meet the criteria for any other resource. In some embodiments, a responding AP may prioritize the BSSID resource 1112.2 over the SSID resource 1112.3. In some embodiments, a responding AP may prioritize the SSID resource 1112.3 over the random access resource 1112.1. In some embodiments, an AP may not choose not to respond to a probe request 1102, 1104, for which it meets one or more specified criteria.

The STA that transmitted the probe requests 1102, 1104 detects energy on the allocated resources 1112.1, 1112.2, and 1112.3. In the event of a collision, the STA may not be able to receive a probe response, but may be able to detect that transmissions were made in a resource assigned to a specific BSSID or SSID. This may allow the STA to determine that APs are available corresponding to the resource. The STA can then transmit subsequent dedicated probe requests in a further attempt to receive non-colliding probe responses from the APs.

In some embodiments, the probe request may define the frame type that responders use to respond to the request. In some embodiments, the probe request may allow the responder to select the frame type that fits to the resource used for responding In some embodiments, a requesting STA may first transmit a probe request that requests very short responses. Based on availability of the BSSs and the signal strengths of the responses the STA may decide whether to request further details from the AP or whether to associate with the AP. In some embodiments, requesting further details from the AP may comprise an additional probe request or pre-association service discovery mechanisms such as transmission of an ANQP request frame. In some embodiments, the STA performs fast active scanning to multiple channels and, based at least on the responses on from those channels, the STA may select a channel and an AP for association or to request further details.

A response to probe requests 1102, 1104 may be a probe response frame or a short frame such as a FILS discovery frame identifying the responding BSS. In some embodiments, if an AP responds with a short frame that does not contain all necessary parameters, the STA may subsequently transmit an individually addressed legacy probe request to request a full probe response from the AP. In some embodiments, an AP responding with a short frame indicates whether the short frame does not contain all necessary parameters.

In some embodiments, other devices in the channel may use the transmitted OFDMA formatted probe responses to detect availability of specific APs in the channel. This may reduce the number of discovery frames transmitted in the channel and may accelerate scanning by the STAs. Similarly, in some embodiments, active scanning STAs receive extended range beacons, probe responses, and probe request frames.

Figure 12:
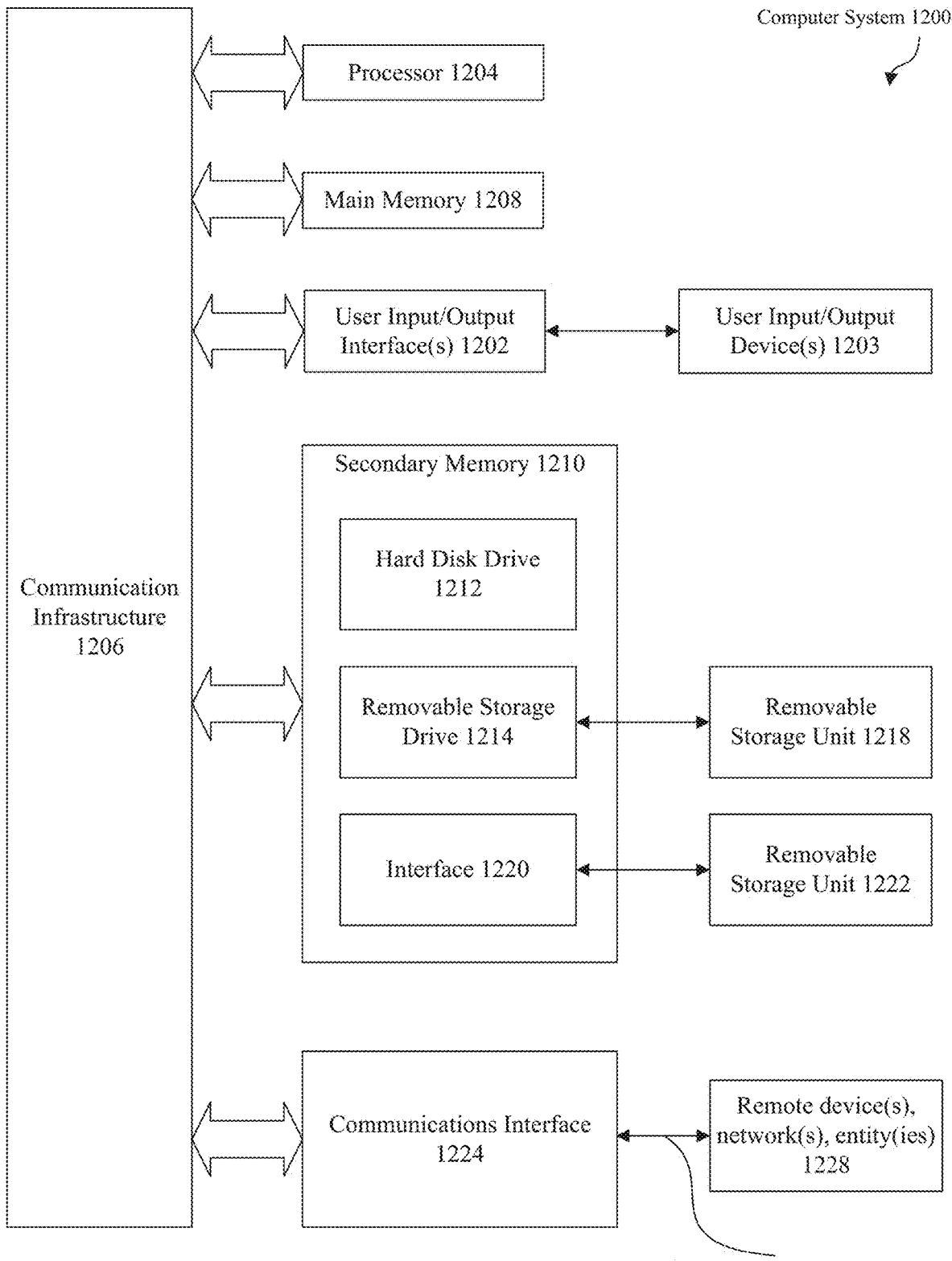
FIG. 12 is an example computer system useful for implementing some embodiments or portion(s) thereof.

Various embodiments can be implemented, for example, using one or more computer systems, such as computer system 1200 shown in FIG. 12. Computer system 1200 can be any computer capable of performing the functions described herein. For example, and without limitation, electronic devices 102, 104, 106 (and/or other apparatuses and/or components shown in the figures) and the flowchart of FIG. 4 may be implemented using one or more computer systems 1200, or portions thereof.

Computer system 1200 includes one or more processors (also called central processing units, or CPUs), such as a processor 1204. Processor 1204 is connected to a communication infrastructure or bus 1206. In some embodiments, processor 1204 comprises a digital signal processor (DSP).

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

The operations in the preceding embodiments can be implemented in a wide variety of configurations and architectures. Therefore, some or all of the operations in the preceding embodiments may be performed in hardware, in software or both. For example, at least some of the operations may be implemented using firmware in communications interface 1224 and/or the PHY layer of communications interface 1224, such as hardware in an interface circuit. In particular, OFDM may be implemented in the PHY layer, timing may be implemented in a lower portion of the data-link or MAC layer, and management may be implemented in an upper portion of the data-link or MAC layer (such as in a driver).

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 12. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. An access point, comprising:
   a communications interface configured to transmit a set of beacons in a single basic service set (BSS), wherein the set of beacons comprises a first subset of beacons and a second subset of beacons, and beacons in the first subset of beacons are configured to be detectable from a greater distance than beacons in the second subset of beacons and
   wherein the first subset of beacons are transmitted during a first interval of a predetermined duration of time, and the second subset of beacons are transmitted during a second interval of the predetermined duration of time;
   at least one processor configured to determine the access point does not need to be made discoverable to a station using passive scanning based at least in part on a power criteria; and
   wherein the communications interface is further configured to stop transmission of beacons in the first subset of beacons and beacons in the second subset of beacons based at least in part on the determination.

2. The access point of claim 1,
   wherein a beacon in the first subset of beacons comprises information indicating the first interval.

3. The access point of claim 2,
   wherein the beacon in the first subset of beacons further comprises information indicating the second interval.

4. The access point of claim 1,
   wherein a beacon in the first subset of beacons comprises information indicating a termination time for transmission of beacons in the first subset of beacons.

5. The access point of claim 4,
   wherein the beacon in the first subset of beacons further comprises information indicating a termination time for transmission of beacons in the second subset of beacons.

6. The access point of claim 1,
   wherein a beacon in the first subset of beacons comprises information indicating an offset between transmissions of beacons in the first subset of beacons and transmissions of beacons in the second subset of beacons.

7. A method for transmitting beacons by an access point, comprising:
   transmitting beacons associated with a first set of beacons in a basic service set (BSS);
   receiving extended range transmission information;
   transmitting, during a predetermined duration of time in the BSS, the first set of beacons and a second set of beacons based at least in part on the received extended range transmission information, wherein the second set of beacons comprises extended range beacons;
   first determining that the access point does need to be made discoverable to a station using passive scanning based at least in part on a power criteria;
   second determining that the access point does not need to be made detectable at an extended range to the station based at least in part on the first determination and the extended range transmission information;
   stopping transmission of beacons in the second subset of beacons based at least in part on the second determination; and
   transmitting, for the predetermined duration of time, beacons in the first subset of beacons based at least in part on the second determination.

8. The method for transmitting beacons of claim 7, further comprising:
   transmitting a beacon associated with the first set of beacons after receiving the extended range transmission information.

9. The method for transmitting beacons of claim 7,
   wherein beacons associated with at least one of the first set of beacons or the second set of beacons are transmitted using a first radio access technology; and
   wherein the extended range transmission information is received using a second radio access technology.

10. The method for transmitting beacons of claim 7,
    wherein receiving the extended range transmission information comprises accessing extended range transmission criteria stored at the access point.

11. The method for transmitting beacons of claim 7, further comprising:
    receiving updated extended range transmission information; and
    terminating transmission of beacons associated with the second set of beacons based at least in part on the updated extended range transmission information.

12. The method for transmitting beacons of claim 7, further comprising:
    transmitting beacons associated with the first set of beacons based at least on a first interval; and
    transmitting beacons associated with the second set of beacons based at least on a second interval.

13. The method for transmitting beacons of claim 12, wherein a beacon associated with the second set of beacons comprises information indicating the second interval.

14. The method for transmitting beacons of claim 13, wherein the beacon in the second set of beacons further comprises information indicating an offset between transmissions of beacons associated with the second set of beacons and transmissions of beacons associated with the first set of beacons.

15. A method for transmitting beacons by an access point, comprising:
   transmitting, during a predetermined duration of time in a single basic service set (BSS), a first set of beacons during a first interval of the predetermined duration of time, and a second set of beacons during a second interval of the predetermined duration of time, wherein beacons associated with the first set of beacons are configured to be detectable from a greater distance than beacons associated with the second set of beacons;
   determining the access point does not need to be made discoverable to a station using passive scanning based at least in part on a power criteria; and
   stopping transmission of beacons in the first subset of beacons and beacons in the second subset of beacons based at least in part on the determination.

16. The method of claim 15, wherein a beacon associated with the first set of beacons comprises information indicating the first interval.

17. The method of claim 16, wherein the beacon associated with the first set of beacons further comprises information indicating the second interval.

18. The method of claim 15, wherein a beacon associated with the first set of beacons comprises information indicating a termination time for transmission of beacons associated with the first set of beacons.

19. The method of claim 18, wherein the beacon associated with the first set of beacons further comprises information indicating a termination time for transmission of beacons associated with the second set of beacons.

20. The method of claim 15, wherein a beacon associated with the first set of beacons comprises information indicating an offset between transmissions of beacons associated with the first set of beacons and transmissions of beacons associated with the second set of beacons.

* * * * *